(12) United States Patent
Lee et al.

(10) Patent No.: US 12,055,662 B2
(45) Date of Patent: Aug. 6, 2024

(54) ELECTRONIC DEVICE INCLUDING SENSOR AND METHOD OF OPERATION THEREFOR

(71) Applicant: Samsung Electronics Co., Ltd., Gyeonggi-do (KR)

(72) Inventors: Johngy Lee, Gyeonggi-do (KR); Jaeyoung Huh, Gyeonggi-do (KR); Kyungwan Park, Gyeonggi-do (KR); Juhwan Lee, Gyeonggi-do (KR); Jeongwoo Han, Gyeonggi-do (KR); Sungchul Park, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 287 days.

(21) Appl. No.: 17/570,007

(22) Filed: Jan. 6, 2022

(65) Prior Publication Data

US 2022/0128659 A1 Apr. 28, 2022

Related U.S. Application Data

(63) Continuation of application No. PCT/KR2020/007860, filed on Jun. 17, 2020.

(30) Foreign Application Priority Data

Jul. 9, 2019 (KR) .................. 10-2019-0082427

(51) Int. Cl.
*G01S 7/484* (2006.01)
*G01J 1/42* (2006.01)
*G01S 17/08* (2006.01)
*H04N 5/235* (2006.01)
*H04N 23/72* (2023.01)

(52) U.S. Cl.
CPC ............. *G01S 7/484* (2013.01); *G01J 1/4204* (2013.01); *G01S 17/08* (2013.01); *H04N 23/72* (2023.01)

(58) Field of Classification Search
CPC ......... G01S 17/08; G01S 7/484; H04N 23/72; G01J 1/4204
See application file for complete search history.

(56) References Cited

U.S. PATENT DOCUMENTS

| 10,285,243 | B2 | 5/2019 | Joseph et al. |
| 2014/0240492 | A1* | 8/2014 | Lee ...................... H04N 25/135 348/136 |

(Continued)

FOREIGN PATENT DOCUMENTS

| JP | 2013-246087 | 12/2013 |
| JP | 2018-205042 | 12/2018 |

(Continued)

OTHER PUBLICATIONS

European Search Report dated Jul. 6, 2022 issued in counterpart application No. 20836658.3-1206, 8 pages.

*Primary Examiner* — Jamil Ahmed
(74) *Attorney, Agent, or Firm* — The Farrell Law Firm, P.C.

(57) ABSTRACT

Methods and electronic devices including a sensor are provided. An amount of external light outside the electronic device is determined through a light-receiving unit of the sensor. An intensity of light to be outputted through a light-emitting unit of the sensor is configured based on the amount of external light. The light having the configured intensity is output through the light-emitting unit of the sensor.

20 Claims, 7 Drawing Sheets

(56) References Cited

U.S. PATENT DOCUMENTS

2016/0109232 A1  4/2016  Shin et al.
2019/0149706 A1* 5/2019  Rivard .................. H04N 23/73
                                                    348/371
2020/0319307 A1  10/2020 Huh et al.

FOREIGN PATENT DOCUMENTS

| KR | 10-1997-0011143 | 7/1997 |
| KR | 10-2014-0073117 | 6/2014 |
| KR | 10-2016-0046706 | 4/2016 |
| KR | 10-2019-0046557 | 5/2019 |
| KR | 10-2019-0048944 | 5/2019 |
| KR | 10-2019-0060346 | 6/2019 |
| KR | 10-2020-0117567 | 10/2020 |

* cited by examiner

ELECTRONIC DEVICE INCLUDING SENSOR AND METHOD OF OPERATION THEREFOR

CROSS-REFERENCE TO RELATED APPLICATION(S)

This application is a bypass continuation application, claiming priority under § 365(c) to International Application No. PCT/KR2020/007860, filed on Jun. 17, 2020, which is based on and claims priority to Korean Patent Application Serial No. 10-2019-0082427, filed on Jul. 9, 2019, in the Korean Intellectual Property Office, the entire disclosure of each of which is incorporated herein by reference in its entirety.

BACKGROUND

1. Field

The disclosure relates generally to an electronic device including a sensor, and more particularly, to an electronic device and an operating method thereof for obtaining distance information of an object using the sensor.

2. Description of Related Art

Research is actively conducted on three-dimensional (3-D) cameras, motion sensors, and laser radars (LADARs) that are capable of obtaining distance information with respect to an object. In particular, 3-D content is an important factor in the development of and increasing demand for a 3-D display apparatus that is capable of displaying an image having a sense of depth. Accordingly, various depth image acquisition apparatuses that enable a common user to directly fabricate 3-D contents are being developed.

Depth information of an object may be obtained by using a binocular stereo vision method using two cameras, or by using triangulation using structured light and a camera. However, in such methods, accuracy degrades as the distance between an object and an electronic device increases. It may be difficult to obtain precise depth information because the method is dependent on a surface state of an object.

A time of flight (ToF) sensor may have a characteristic sensitive to light because the ToF sensor obtains depth information using an infrared light source. The accuracy of a value detected by the ToF sensor may decrease depending on an external environment. For example, if there is a significant amount of infrared noise outside of an electronic device, the accuracy of a value detected by the ToF sensor may decrease.

If the intensity of light outputted through the ToF sensor is regularly maintained regardless of an environment outside the electronic device, power consumption heat generation may increase.

SUMMARY

According to an aspect, an electronic device is provided that includes a sensor including a light-emitting unit capable of outputting light having a designated wavelength band and a light-receiving unit capable of obtaining light. The electronic device also includes a processor configured to determine an amount of external light outside the electronic device through the light-receiving unit of the sensor, and adjust an intensity of light to be outputted through the light-emitting unit of the sensor based on the amount of external light. The processor is also configured to output light having the designated wavelength band with the adjusted intensity through the light-emitting unit.

According to an aspect, an operating method of an electronic device including a sensor is provided. An amount of external light outside the electronic device is determined through a light-receiving unit of the sensor. An intensity of light to be outputted through a light-emitting unit of the sensor is configured based on the amount of external light. The light having the configured intensity is output through the light-emitting unit of the sensor.

According to an aspect, an electronic device is provided that includes a sensor including a light-emitting unit capable of outputting light having a designated wavelength band and a light-receiving unit capable of obtaining external light. The electronic device also includes an illuminance sensor and a processor. The processor is configured to determine an amount of external light through the illuminance sensor, and adjust an intensity of light to be outputted through the light-emitting unit of the sensor based on the amount of external light. The processor is also configured to output the light having a designated wavelength band with the adjusted intensity through the light-emitting unit, obtain at least some of the outputted light that is reflected through the light-receiving unit, and measure a distance to an external object based on the at least some of the outputted light that is reflected.

The electronic device can increase the accuracy of a value detected through a distance measuring sensor by adjusting the intensity of light outputted through the sensor based on the amount of light outside the electronic device.

The electronic device can reduce power consumption and reduce the generation of heat by adjusting the intensity of light outputted through the sensor based on the amount of light outside the electronic device.

BRIEF DESCRIPTION OF DRAWINGS

The above and other aspects, features, and advantages of certain embodiments of the disclosure will be more apparent from the following description taken in conjunction with the accompanying drawings, in which.

DETAILED DESCRIPTION

Figure 1:
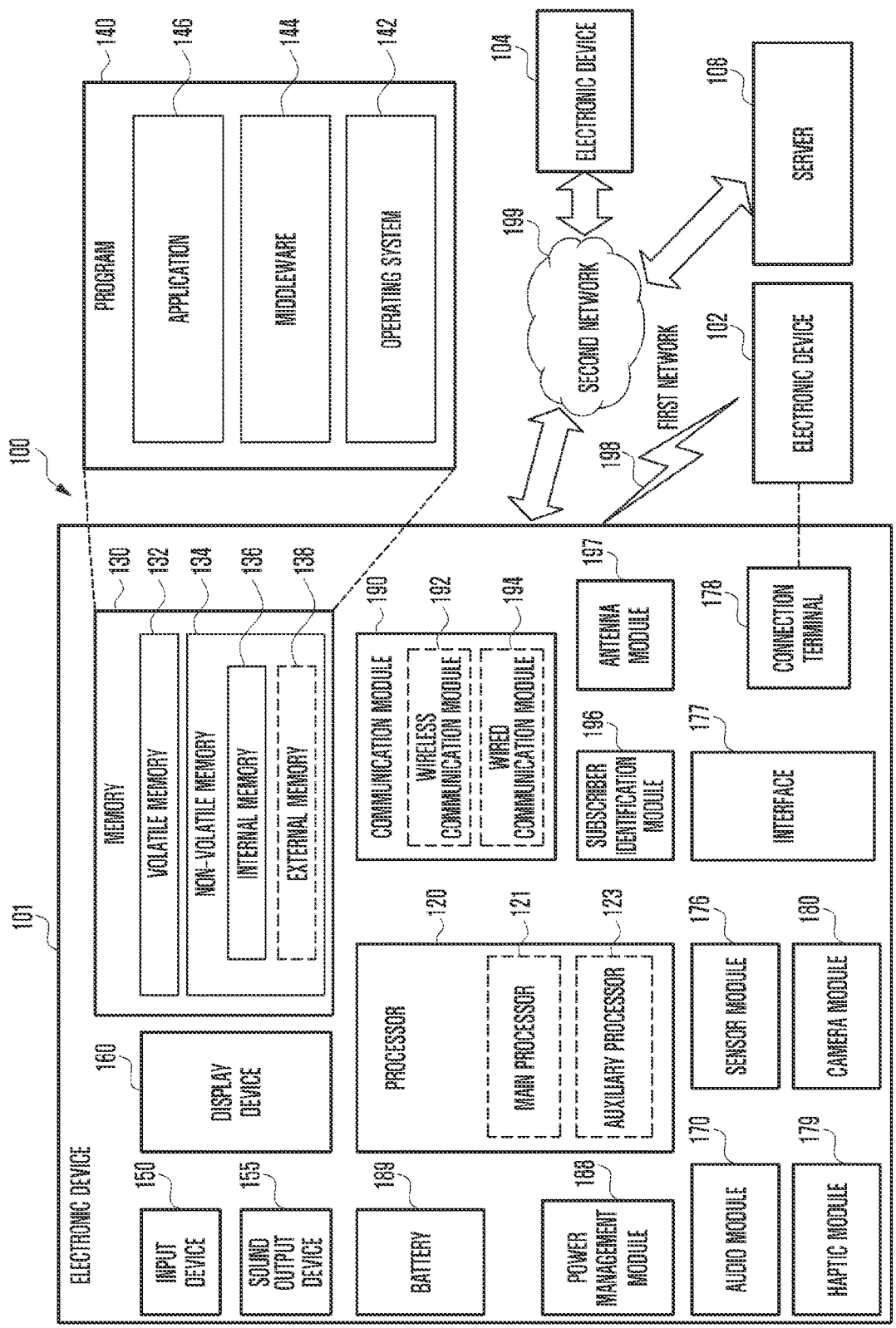
FIG. 1 is a block diagram illustrating an electronic device within a network environment, according to an embodiment.

Embodiments are described in detail with reference to the accompanying drawings. The same or similar components may be designated by the same or similar reference numerals although they are illustrated in different drawings.

Detailed descriptions of constructions or processes known in the art may be omitted to avoid obscuring the subject matter of the disclosure. The embodiments and the terms used therein are not intended to limit the technology disclosed herein to specific forms, and should be understood to include various modifications, equivalents, and/or alternatives to the corresponding embodiments. A singular expression may include a plural expression unless they are definitely different in a context.

FIG. 1 is a block diagram illustrating an electronic device in a network environment, according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, la haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing; unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state executing an application).

According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 1501 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMT), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GLASS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (DISI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme e.g., a bus, general purpose input and output (GPM), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
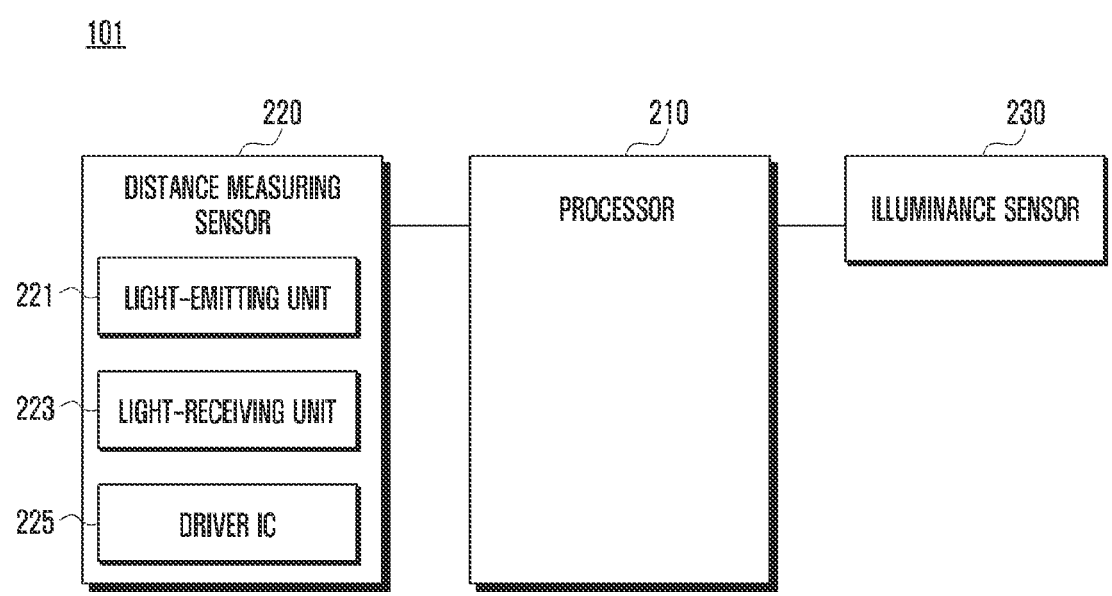
FIG. 2 is a block diagram illustrating an electronic device, according to an embodiment.

FIG. 2 is a block diagram illustrating an electronic device, according to an embodiment.

Referring to FIG. 2, the electronic device 101 includes a processor 210 (e.g., the processor 120 in FIG. 1), a distance measuring sensor 220, and an illuminance sensor 230. When one or more of the elements illustrated in FIG. are omitted or substituted, an implementation of embodiments disclosed herein will not be affected. The electronic device 101 may further include a red-green-blue (RGB) camera (e.g., the camera module 180 in FIG. 1).

The processor 210 is an element capable of performing an operation or data processing about control and/or communication of the elements of the electronic device 101, and may include at least some of the construction and/or function of the processor 120 in FIG. 1. The processor 210 may be operatively coupled to the elements of the electronic device 101, for example.

The distance measuring sensor 220 may measure an actual distance between an external object and the electronic device 101, or a relative location from an external object. The relative location from the external object may be location information identified based on a distance between the electronic device 101 and the external object, for example.

The distance measuring sensor 220 may be implemented in various forms in which a distance between an external object and the electronic device 101 may be measured. For example, the distance measuring sensor 220 may be a ToF sensor. For example, the distance measuring sensor 220 may output light (e.g., light implemented in a pulse form) in various directions, may check a difference between the time when the outputted light is reflected and returned by an external object and the time when the first light was outputted, and may measure a location of the external object and a distance between the electronic device 101 and the external object based on the checked difference between the times.

The distance measuring sensor 220 includes a light-emitting unit 221, a light-receiving unit 223, and a driver integrated circuit (IC) 225.

The light-emitting unit 221 may output light (e.g., pulse light) having various forms. The light-emitting unit 221 may include at least one light source among a laser light source, such as, for example, a light-emitting diode or a laser diode (VCSEL). The light-emitting unit 221 may include a sound wave generator having a frequency other than light. The light-emitting unit may output various waveforms, such as a radio wave, to the outside without being limited to light. The light-emitting unit 221 may include at least one light source capable of outputting light having a designated wavelength band. The designated wavelength band may be a wavelength band invisible to a human eye, such as, for example, a wavelength having a near infrared (MR) region of 750 nm to 1500 nm. The designated wavelength band is not limited to the wavelength having the NIR region, and may also include light having a wavelength band (e.g., a visible ray), which is visible to a human eye. The light-emitting unit 221 may output light modulated in a high frequency pulse form based on a designated modulated frequency value. For example, the light-emitting unit 221 may output light while making the light flicker at designated time intervals. The light-emitting unit 221 may output light by receiving a driving signal from the processor 210.

The light-receiving unit 223 may detect reflected light reflected and returned by an external object among light outputted through the light source. The light-receiving unit 223 may include a light-receiving lens and an image pickup device, for example. The image pickup device may include at least one photo diode or at least one pyroelectric detector, for example. The light-receiving unit 223 may be synchronized with the light-emitting unit 221 based on the same modulation frequency value. For example, since the light-emitting unit 221 and the light-receiving unit 223 are synchronized with each other based on the same modulation frequency value, the processor 210 may measure a distance to external object by identifying a phase difference between light outputted by the light-emitting unit 221 and light detected by the light-receiving unit 223. For example, a modulation frequency of light outputted through the light-emitting unit 221 and a modulation frequency of light, which may be obtained through the light-receiving unit, may be synchronized with each other. Accordingly, since light having the same modulation frequency value as light outputted by the light-emitting unit 221 can be obtained through the light-receiving unit 223, a phase difference between the light outputted through the light-emitting unit 221 and the light obtained through the light-receiving unit 223 can be checked when demodulation is performed on the light received through the light-receiving unit 223.

The driver IC 225 may be a device that controls the light-emitting unit 221. For example, the driver IC 225 may receive a driving signal from the processor 210, and may drive the light source of the light-emitting unit 221 based on the driving signal. The driver IC 225 may drive the light source by applying power (e.g., a driving voltage, a driving current) to the light source. The intensity and/or wavelength of light radiated from the light source to an external object may be changed depending on the size of a driving current applied by the driver IC 225. As the intensity of a driving current applied by the light source is increased, the intensity of output light outputted by the light source may be increased.

The illuminance sensor 230 may be a sensor capable of obtaining light having a designated wavelength band. The illuminance sensor 230 may be an illuminance sensor included in a heart rate measurement (HRM) sensor, for example. The illuminance sensor 230 may measure the amount of light having a designated wavelength band outside the electronic device 101 under the control of the processor 210.

An RGB camera may capture a still image and a moving image. The RGB camera may use an automatic exposure (AE) function. The AE function may automatically adjust a shutter speed or a lens iris based on brightness of a subject so that a standard exposure can always be obtained, for example, upon photographing. The RGB camera may measure the amount of light outside the electronic device 101 by using the AE function under the control of the processor 210.

The processor 210 may check the amount of light having a designated wavelength band outside the electronic device 101 through the light-receiving unit 223 of the distance measuring sensor 220.

The processor 210 may set the intensity of output light to be outputted through the light-emitting unit 221 of the distance measuring sensor 220 based on the checked amount of light having a designated wavelength band outside the electronic device 101.

The illuminance sensor 230 may be included in at least some region of the distance measuring sensor 220, and the illuminance sensor 230 and the driver IC 225 may be directly connected. Accordingly, the driver IC 225 may directly set the intensity of output light to be outputted through the light-emitting unit 221 based on the amount of light obtained by the illuminance sensor. The light-emitting unit 221 may be directly connected to the illuminance sensor 230, and the light-emitting unit 221 may be directly controlled based on external light obtained by the illuminance sensor 230.

The processor 210 may control output light having the set intensity to be outputted through the light-emitting unit 221 of the distance measuring sensor 220. The processor 210 may control the distance measuring sensor 220 to output the output light having the set intensity toward an external object, for example. The processor 210 may obtain light reflected by an external object among the output light through the light-receiving unit 223 of the distance measuring sensor 220. The processor 210 may calculate distance information for the external object by using the obtained reflected light.

The processor 210 may control the distance measuring sensor 220 to not output light through the light-emitting unit 221, while checking the amount of light having a designated wavelength band outside the electronic device 101 through the light-receiving unit 223 of the distance measuring sensor 220.

The processor 210 may control the distance measuring sensor 220 to check the amount of light having a designated wavelength band outside the electronic device 101 through the light-receiving unit 223 based on an event (e.g., an event that executes a camera application) being generated that drives the distance measuring sensor 220.

The processor 210 may control the amount of light having a designated wavelength band outside the electronic device 101 to be measured a number of times through the light-receiving unit 223 for a designated time, may calculate an average of the measured values, and may set the intensity of output light to be outputted through the light-emitting unit 221 of the distance measuring sensor 220 based on the calculated average value.

When an average of the measured values is identical with a pre-designated condition, the processor 210 may set the intensity of output light according to the pre-designated condition. For example, when the average value is a designated first condition, the processor 210 may output light at an intensity previously set in a mapping table corresponding to the first condition. The intensity of the output light previously set in the mapping table corresponding to the first condition may be changed by the electronic device. The intensity of the output light set in the mapping table may be changed by the existing learning data that was learned by the electronic device. The intensity of the output light set in the mapping table may be changed by data obtained from a user or an external server.

The intensity of the output light may be changed based on pieces of information (e.g., a state of the output light and the number of times that the output light is emitted) related to the intensity of the output light. For example, when the number of operations of emitting output light is greater than a preset number, a numerical value of a mapping table may be changed.

The processor 210 may check the amount of light outside the electronic device 101, may identify that additional measurement is necessary when a value of the checked amount of light is out of a preset range, and may control the amount of light outside the electronic device 101 to be measured a number of times for a designated time. For example, if the checked amount of light having a designated wavelength band outside the electronic device 101 is too high, the processor 210 may identify that the measured amount of light is not a normal amount of light, and may control the amount of light outside the electronic device 101 to be measured a number of times for a designated time for additional measurement.

The processor 210 may periodically check the amount of light outside the electronic device 101 through the light-receiving unit 223 of the distance measuring sensor 220. For example, the processor 210 may periodically check the amount of light having a designated wavelength band outside the electronic device 101 through the light-receiving unit 223.

The processor 210 may set the intensity of output light to be outputted through the light-emitting unit 221 of the distance measuring sensor 220 in proportion to the checked amount of light. The processor 210 may compare the checked amount of light and a preset threshold value, and may set the intensity of output light to be outputted through the light-emitting unit 221 of the distance measuring sensor 220 based on a result of the comparison.

The processor 210 may check the amount of light outside the electronic device 101 through the illuminance sensor 230. For example, the processor 210 may check the amount of light having a designated wavelength band outside the electronic device 101 through the illuminance sensor 230.

The processor 210 may check the amount of light outside the electronic device 101 through the illuminance sensor 230 and the light-receiving unit 223 of the distance measuring sensor 220. The processor 210 may set the intensity of output light to be outputted through the light-emitting unit 221 of the distance measuring sensor 220 based on the amount of the light checked through the illuminance sensor 230 and the light-receiving unit 223 of the distance measuring sensor 220.

The processor 210 may periodically check the amount of light outside the electronic device 101 again by using the illuminance sensor 230. For example, the processor 210 may periodically check the amount of light having a designated wavelength band outside the electronic device 101 again by using the illuminance sensor 230.

The processor 210 may set the intensity of output light to be outputted through the light-emitting unit 221 of the distance measuring sensor 220 again based on a result of the amount of light periodically re-checked outside the electronic device 101.

The processor 210 may check the amount of light outside the electronic device 101 through the AE function of the RGB camera.

The processor 210 may check the amount of external light based on information corresponding to the external light obtained through an image sensor (ISP) for generating a photo based on information obtained through a camera within the electronic device 101. Light information of external light introduced through a lens of a camera of the electronic device 101 may be obtained through an image sensor associated with the camera within the electronic device 101. The intensity of light outputted through the light-emitting unit 221 may be adjusted by analyzing external light information obtained from the light information of the external light.

Figure 3:
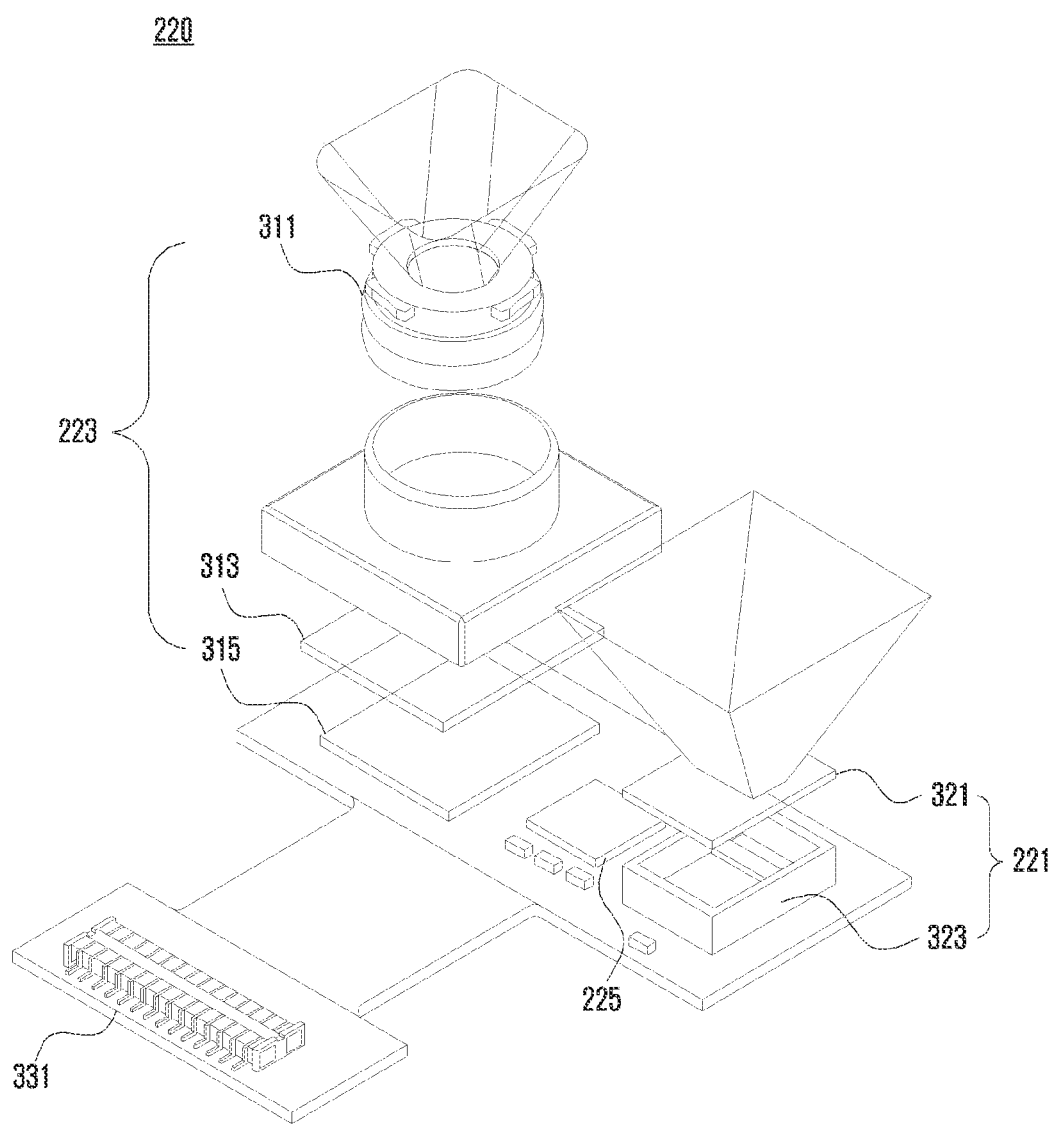
FIG. 3 is a diagram illustrating an exploded perspective view of a distance measuring sensor, according to an embodiment.

FIG. 3 is a diagram illustrating an exploded perspective view of a distance measuring sensor, according to an embodiment.

Referring to FIG. 3, the distance measuring sensor 220 includes the light-receiving unit 223, the light-emitting unit 221 and the driver IC 225.

The light-receiving unit 223 includes a lens barrel 311 coupled to a lens, a filter 313, and an image sensor 315. The lens may be an element for gathering light. The filter 313 may be an element for transmitting only light having a designated wavelength band. For example, the filter 313 may be an infrared (IR) band pass filter for transmitting only light having an infrared wavelength band. The image sensor 315 may be a sensor for measuring the intensity of light passing through the filter 313, calculating a phase difference between the measured intensity of light and the intensity of light outputted by the light-emitting unit 221, and calculating information on a distance up to an external object by using the calculated phase difference. The image sensor 315 may include one photo diode or one pyroelectric detector. If distances up to multiple points on an external object are to be simultaneously measured, the image sensor may be configured to include a photodiode and/or a pyroelectric detector in each of a plurality of cells arranged as a one-dimensional and/or two-dimensional array. A plurality of photodiodes and/or pyroelectric detectors may be included in one cell.

The light-emitting unit 221 includes a diffuser 321 and a light source 323, The diffuser 321 may be an element for diffusing light outputted from the light source 323. The light source 323 may include at least one light source of a laser light source, a light-emitting diode, and a laser diode. The light source 323 may output light having a designated wavelength band.

The driver IC 225 may be a device for controlling the light-emitting unit 221. For example, the driver IC 225 may receive a driving signal from the processor 210, and may drive the light source of the light-emitting unit 221 based on the driving signal. The driver IC 225 may drive the light source 323 by applying power (e.g., a driving voltage, a driving current) to the light source 323.

A connection terminal 331 connected to other elements of the electronic device 101 for mutual communication and for exchanging signals with the other elements. The connection terminal 331 may include a connection terminal for MIDI communication.

Figure 4:
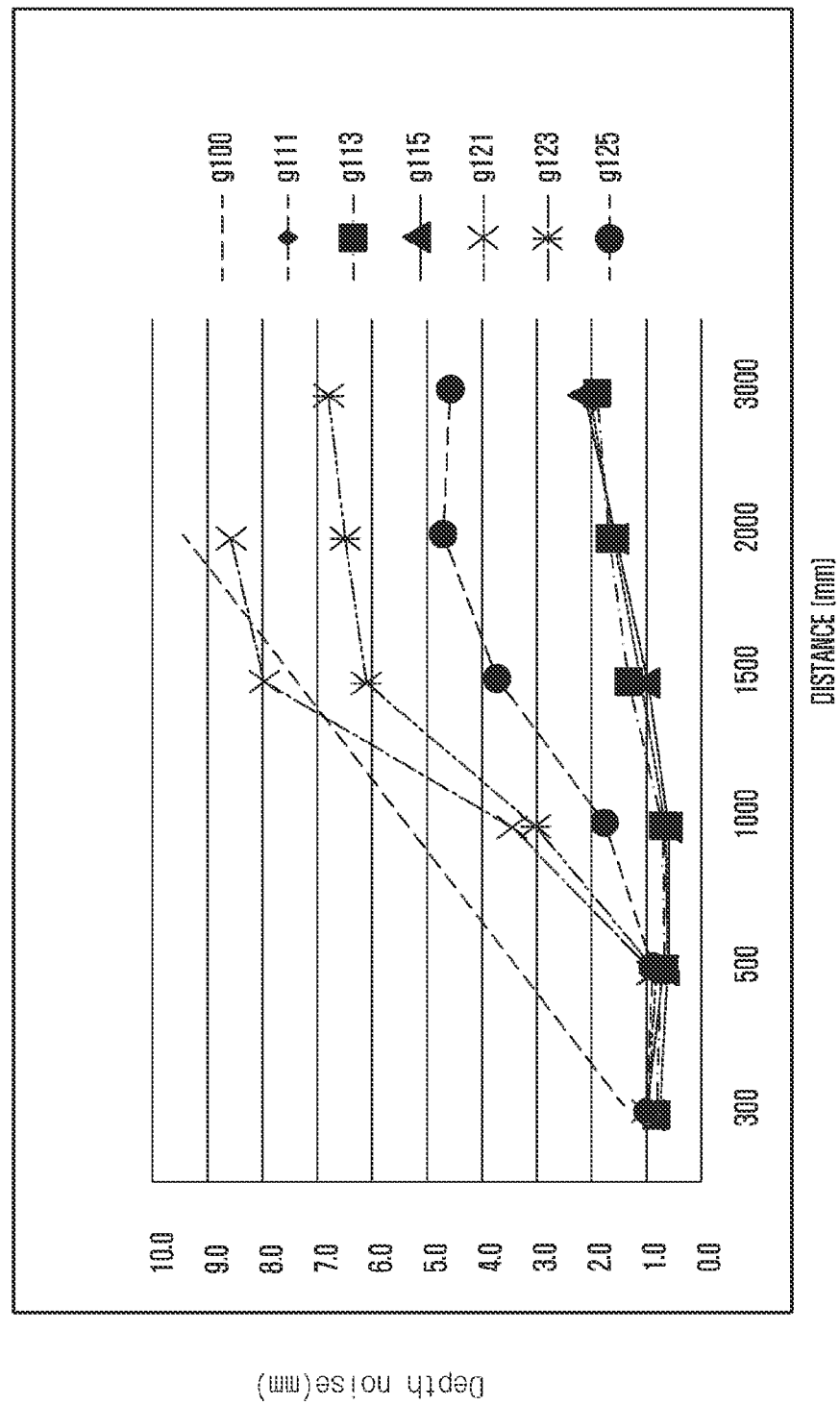
FIG. 4 is a graph illustrating noise according to distances when the electronic device measures depth information in various environments by using the distance measuring sensor, according to an embodiment.

FIG. 4 is a graph illustrating noise according to distances when the electronic device measures depth information in various environments by using the distance measuring sensor, according to an embodiment.

Referring to FIG. 4, the distance measuring sensor 220 may generate noise based on an external environment. The distance measuring sensor 220 may have a characteristic sensitive to light because the distance measuring sensor 220 obtains depth information by using a light source having a designated wavelength band. A case in which the accuracy of a value detected by the distance measuring sensor 220 is decreased depending on an external environment may occur. For example, if light similar to a wavelength band of light outputted by the light-emitting unit 221 of the distance measuring sensor 220 is strongly detected outside the electronic device 101, noise according to a distance may occur.

In the graph of FIG. 4, an x axis (transverse axis) may refer to a distance, and a y axis (longitudinal axis) may refer to noise. The noise may refer to a difference between information on a distance up to an external object, which is obtained through the distance measuring sensor 220, and information on an actual distance up to the external object, that is, an error value, for example.

Referring to a first graph g100, in general, the distance measuring sensor 220 may have a characteristic in that noise increases as a distance up to an external object to be measured increases. Second graph g111, third graph g113, and fourth graph g115 illustrate measured result values of noise according to distances of the distance measuring sensor 220 in a state in which noise according to an external environment is small because the amount of light outside the electronic device 101 is small. Fifth graph g121, sixth graph g123, and seventh graph g125 illustrate measured result values of noise according to distances of the distance measuring sensor 220 in a state in which noise according to an external environment is large because the amount of light outside the electronic device 101 is large.

The second graph g111 illustrates measured result values of noise according to distances of the distance measuring sensor 220 in a case in which the intensity of light outputted through the light-emitting unit 221 of the distance measuring sensor 220 is relatively weakly set. The third graph g113 illustrates measured result values of noise according to distances of the distance measuring sensor 220 in a case in which the intensity of the output light is relatively set in the middle. The fourth graph g115 illustrates measured result values of noise according to distances of the distance measuring sensor 220 in a case in which the intensity of the output light is relatively strongly set. For example, the second graph gill may be a case in which a driving current supplied to the light-emitting unit 221 of the distance measuring sensor 220 is set 1.7 A. The third graph g113 may be a case in which a driving current supplied to the light-emitting unit 221 of the distance measuring sensor 220 is set to 2.1 A. The fourth graph g115 may be a case in which a driving current supplied to the light-emitting unit 221 of the distance measuring sensor 220 is set to 2.5 A.

The fifth graph g121 illustrates measured result values of noise according to distances of the distance measuring sensor 220 in a case in which the intensity of output light outputted through the light-emitting unit 221 of the distance measuring sensor 220 is relatively weakly set. The sixth graph g123 illustrates measured result values of noise according to distances of the distance measuring sensor 220 in a case in which the intensity of the output light is relatively set in the middle. The seventh graph g125 illustrates measured result values of noise according to distances of the distance measuring sensor 220 in a case in which the intensity of the output light is relatively strongly set. For example, the fifth graph g121 may be a case in which a driving current supplied to the light-emitting unit 221 of the distance measuring sensor 220 is set to 1.7 A. The sixth graph g123 may be a case in which a driving current supplied to the light-emitting unit 221 of the distance measuring sensor 220 is set to 2.1 A. The seventh graph g125 may be a case in which a driving current supplied to the light-emitting unit 221 of the distance measuring sensor 220 is set to 2.5 A. The driving current values are illustrative, and are not intended to limit embodiments disclosed herein.

With reference to the second, third, and fourth graphs g111, g113 and g115, the sizes of the noise according to the distances are almost similar. In an external environment in which the amount of light outside the electronic device 101 is small, noise according to a distance of the distance measuring sensor 220 may be small. Accordingly, if the amount of light outside the electronic device 101 is small, power consumption can be reduced by configuring the intensity of light outputted through the light-emitting unit 221 of the distance measuring sensor 220 (e.g., drivable minimum intensity) to be low.

In each of the cases of the fifth, sixth, and seventh graphs g121, g123 and g125, the noise according to the distances of the distance measuring sensor 220 is large compared to each of the second, third, and fourth graphs g111, g113 and g115. In the case of an external environment in which the amount of light outside the electronic device 101 is large, noise according to a distance of the distance measuring sensor 220 may be significant. Referring to the fifth graph g121, if the amount of light outside the electronic device 101 is large, when the intensity of light outputted through the light-emitting unit 221 of the distance measuring sensor 220 is weakly set, the occurrence of the noise according to the distances of the distance measuring sensor 220 is very large. Referring to the seventh graph g125, if the amount of light outside the electronic device 101 is large, when the intensity of light outputted through the light-emitting unit 221 of the distance measuring sensor 220 is strongly set, the occurrence of noise according to the distances of the distance measuring sensor 220 is small compared to the case in which the intensity of the output light is weakly set. Accordingly, if the amount of light outside the electronic device 101 is large, the occurrence of noise can be reduced and the accuracy of a measured value can be improved by setting (e.g., drivable maximum intensity) the intensity of light outputted through the light-emitting unit 221 of the distance measuring sensor 220 to be high.

Figure 5:
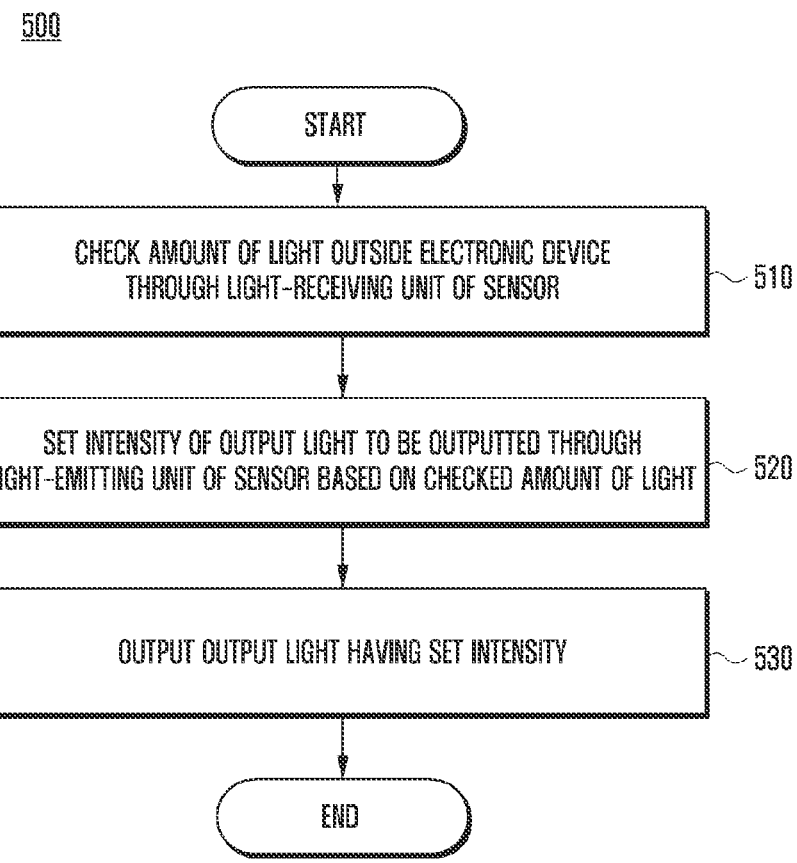
FIG. 5 is a flowchart illustrating operations of the electronic device, according to an embodiment.

The electronic device 101 may check the amount of light outside the electronic device 101, and may set the intensity of light to be outputted through the light-emitting unit 221 of the distance measuring sensor 220 based on the checked amount of the light. For example, if the amount of light outside the electronic device 101 is high, in order to increase the accuracy of a measured value by reducing the occurrence of noise, the intensity of output light to be outputted through the light-emitting unit 221 of the distance measuring sensor 220 may be relatively strongly configured. For example, if the amount of light outside the electronic device 101 is small, in order to reduce power consumption, the intensity of light to be outputted through the light-emitting unit 221 of the distance measuring sensor 220 may be relatively weakly configured, FIG. 5 is an flowchart illustrating operation of the electronic device, according to an embodiment.

Referring to an operating flowchart 500, at 510, the processor 210 checks the amount of light outside the electronic device 101 through the light-receiving unit 223 of the distance measuring sensor 220.

The processor 210 may check the amount of light outside the electronic device 101 by using the light-receiving unit 223 of the distance measuring sensor 220 capable of obtaining light having a designated wavelength band. The designated wavelength band may include a wavelength of an NIR region of 750 nm to 1500 nm, for example. The processor 210 may control, as a value for light, information on the light obtained from the light-receiving unit 273 of the distance measuring sensor 220.

The processor 210 may control the light to not be outputted through the light-emitting unit 221 while checking the amount of light having a designated wavelength band outside the electronic device 101 through the light-receiving unit 223 of the distance measuring sensor 220. If the amount of light having a designated wavelength band outside the electronic device 101 is checked through the light-receiving unit 223 while light is controlled to not be outputted, the checked amount of light may be recognized as noise attributable to an external environment.

The processor 210 may check the amount of light outside the electronic device 101 through the light-receiving unit 223 of the distance measuring sensor 220 based on a generated event driving the distance measuring sensor 220. The event that drives the distance measuring sensor 220 may include an event that executes a camera application, for example. Based on the event being generated, which drives the distance measuring sensor 220, the iris of a camera of the electronic device 101 may be changed, light outside the electronic device may be obtained through an image processing sensor (ISP), and the amount of external light may be checked based on the obtained information.

The processor 210 may check the amount of light having a designated wavelength band outside the electronic device 101, and may calculate an average of values measuring the amount of the light a number of times for a designated time.

The processor 210 may continuously control the output of output light by periodically measuring the amount of light having a designated wavelength band outside the electronic device 101 after the distance measuring sensor is driven. The processor 210 may continuously obtain a distance to an external object based on the continuous control over the output of the output light. If the distance measuring sensor for the external object is to be terminated, the electronic device may separately store information on the obtained amount of light. If the obtained amount of light is identified as an abnormal amount of light by periodically checking the information on the obtained amount of light, at least one sensor for accurately identifying the amount of light may simultaneously operate. For example, if information on the amount of light is abnormal, the accuracy of information on the amount of light may be increased based on the information on the obtained amount of light through the illuminance sensor 230 and the image sensor.

Referring back to FIG. 5, at 520, the processor 210 sets the intensity of light to be outputted through the light-emitting unit 221 of the distance measuring sensor 220 based on the checked amount of the light. The processor 210 may configure the intensity of light to be outputted through the light-emitting unit 221 of the distance measuring sensor 220 in proportion to the checked amount of the light. The checked amount of the light and a preset threshold value may be compared with each other, and the intensity of output light may be configured based on a result of the comparison. For example, when the checked amount of the light is less than the preset threshold value, the processor 210 may configure the intensity of light to be outputted through the light-emitting unit 221 of the distance measuring sensor 220 as minimum intensity for check. When the checked amount of the light is greater than or equal to the preset threshold value, the processor 210 may output the intensity of light to be outputted through the light-emitting unit 221 of the distance measuring sensor 220 by setting the intensity of the output light as a maximum value.

At 530, the processor 210 may control the distance measuring sensor 220 to output the light having the set intensity through the light-emitting unit 221 of the distance measuring sensor 220. For example, the processor 210 may control the distance measuring sensor 220 to output the light having the configured intensity to an external object whose distance is to be checked through the light-emitting unit 221 of the distance measuring sensor 220.

The processor 210 may obtain, through the light-receiving unit 223 of the distance measuring sensor 220, reflected light reflected by an external object among the outputted light. For example, some of the light outputted through the light-emitting unit 221 of the distance measuring sensor 220 may be reflected and returned by the external object. The reflected light may be obtained through the light-receiving unit 223 of the distance measuring sensor 220.

The processor 210 may calculate distance information for the external object by using the obtained reflected light. For example, the processor 210 may check the intensity of the reflected light reflected by the external object, may calculate a phase difference between the reflected light and the output light by using the checked intensity of the reflected light, and may calculate information on the distance up to the external object by using the calculated phase difference. The processor 210 may generate a depth image of the external object based on the calculated distance information, for example.

Figure 6:
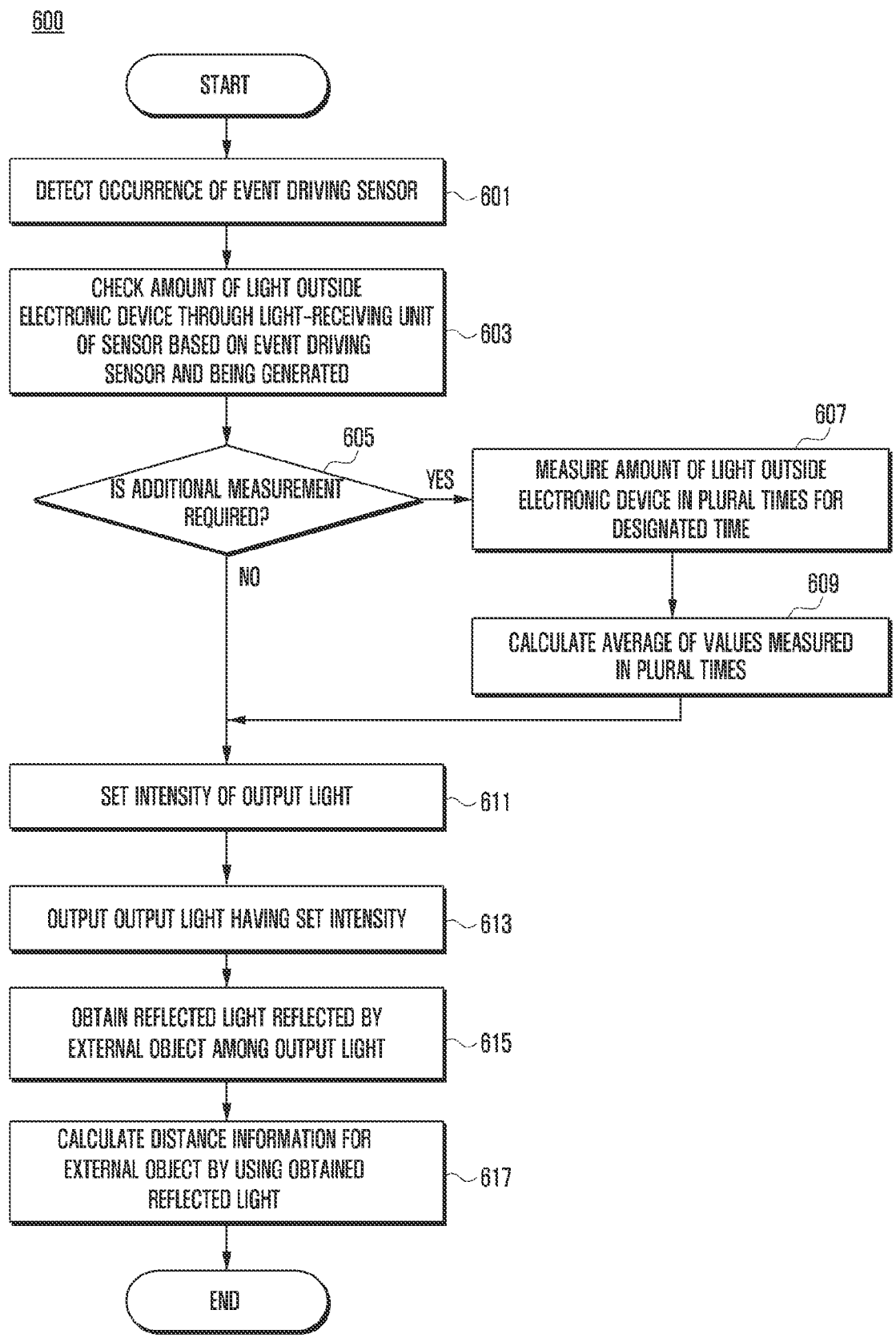
FIG. 6 is a flowchart illustrating operations of the electronic device, according to an embodiment.

FIG. 6 is a flowchart illustrating an operation of the electronic device, according to an embodiment. Descriptions that are redundant with the those provide above with respect to FIG. 5 are omitted.

Referring to an operating flowchart 600, at 601, the processor 210 detects the occurrence of an event that drives the distance measuring sensor 220. The event that drives the distance measuring sensor 220 may include an event that executes a camera application, for example.

At 603, the processor 210 checks the amount of light outside the electronic device 101 through the light-receiving unit 223 of the distance measuring sensor 220 based on the generation of the event driving the distance measuring sensor 220. For example, the processor 210 may check the amount of light having a designated wavelength band outside the electronic device 101 through the light-receiving unit 223 of the distance measuring sensor 220.

At 605, the processor 210 identifies whether an additional measurement of the amount of light outside the electronic device 101 is necessary. For example, when a value of the amount of light checked at 603 is out of a preconfigured range, the processor 210 may identify that an additional measurement is necessary.

If the processor 210 identifies that an additional measurement of the amount of light outside the electronic device 101 is necessary, the processor 210 measures the amount of light outside the electronic device 101 a number of times for a designated period of time, at 607. At 609, the processor 210 calculates an average of the measured values. At 611, the processor 210 sets the intensity of light to be outputted through the light-emitting unit 221 of the distance measuring sensor 220 based on the calculated average value.

If the processor 210 identifies that an additional measurement of the amount of light having a designated wavelength band outside the electronic device 101 is not necessary, at 611, the processor 210 sets the intensity of light to be outputted through the light-emitting unit 221 of the distance measuring sensor 220 based on the amount of light checked at 603.

At 613, the processor 210 controls the distance measuring sensor 220 to output the light having the configured intensity through the light-emitting unit 221 of the distance measuring sensor 270.

At 615, the processor 210 obtains light reflected by an external object among the output light having the configured intensity through the light-receiving unit 223 of the distance measuring sensor 220.

At 617, the processor 210 calculates distance information for the external object by using the obtained reflected light.

Figure 7:
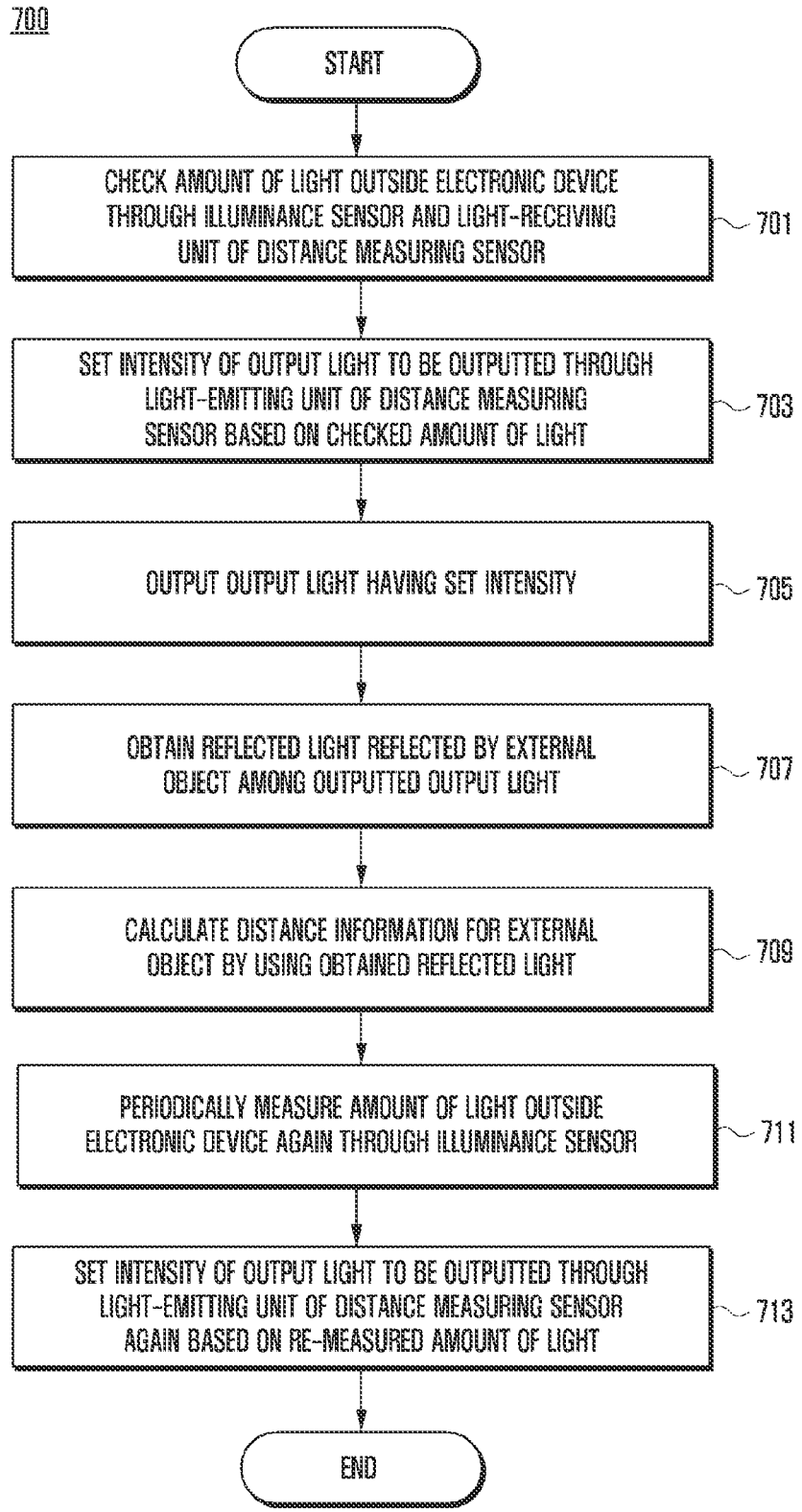
FIG. 7 is a flowchart illustrating the electronic device, according to an embodiment.

FIG. 7 is a flowchart illustrating an operation of the electronic device, according to an embodiment. Descriptions that are redundant with those provided above with respect to FIGS. 5 and 6 are omitted.

Referring to an operating flowchart 700, at 701, the processor 210 checks the amount of light outside the electronic device 101 through the illuminance sensor 230 and the light-receiving unit 223 of the distance measuring sensor 220. The illuminance sensor 230 and the light-receiving unit 223 of the distance measuring sensor 220 may be sensors capable of checking the same amount of light having a designated wavelength band. The processor 210 may obtain an accurately checked value by combining values of the amount of light checked through the illuminance sensor 230 and the amount of light checked through the light-receiving unit 223 of the distance measuring sensor 220. For example, the illuminance sensor 230 may be an assistant sensor for accurately checking the amount of light having a designated wavelength band outside the electronic device 101.

At 703, the processor 210 configures the intensity of light to be outputted through the light-emitting unit 221 of the distance measuring sensor 220 based on the checked amount of the light.

At 705, the processor 210 outputs the light having the set intensity through the light-emitting unit 221 of the distance measuring sensor 220.

At 707, the processor 210 obtains light reflected by an external object among the outputted light through the light-receiving unit 223 of the distance measuring sensor 220. For example, some of the light outputted through the light-emitting unit 221 of the distance measuring sensor 220 may be reflected and returned by the external object. The reflected light may be obtained through the light-receiving unit 223 of the distance measuring sensor 220.

At 709, the processor 210 calculates distance information for the external object by using the obtained reflected light.

At 711, the processor 210 periodically measures the amount of light outside the electronic device 101 again through the illuminance sensor 230. For example, if the distance measuring sensor 220 does not operate, the amount of light outside the electronic device 101 may not be checked through the light-receiving unit 223 of the distance measuring sensor 220. The illuminance sensor 230 may be periodically or continuously driven because it has lower power consumption than the distance measuring sensor 220.

At 713, the processor 210 configures the intensity of light to be outputted through the light-emitting unit 221 of the distance measuring sensor 220 again based on the periodically re-measured amount of light outside the electronic device 101. For example, if the processor 210 identifies that the amount of light outside the electronic device 101 has been increased as a result of the re-measurement, the processor 210 may increase the intensity of light to be outputted through the light-emitting unit 221 of the distance measuring sensor 220. If the processor 210 identifies that the amount of light outside the electronic device 101 has been decreased as a result of the re-measurement, the processor 210 may decrease the intensity of light to be outputted through the light-emitting unit 221 of the distance measuring sensor 220. If the processor 210 identifies that there is no change in the amount of light outside the electronic device 101 as a result of the re-measurement, the processor 210 may maintain the configured intensity of output light.

An electronic device is provided that includes a sensor including a light-emitting unit capable of outputting light having a designated wavelength band and a light-receiving unit capable of obtaining light. The electronic device also includes a processor configured to determine an amount of external light outside the electronic device through the light-receiving unit of the sensor, and adjust an intensity of light to be outputted through the light-emitting unit of the sensor based on the amount of external light. The processor is also configured to output light having the designated wavelength band with the adjusted intensity through the light-emitting unit.

In the electronic device, the processor may be further configured to control the sensor to not output light through the light-emitting unit while determining the amount of external light having the designated wavelength band through the light-receiving unit of the sensor.

In the electronic device, the processor may be further configured to control the sensor to determine the amount of external light having the designated wavelength band through the light-receiving unit based on a generation of an event driving the sensor.

In the electronic device, the processor may be configured to measure the amount of external light having the designated wavelength band a plurality of times through the light-receiving unit for a designated period time, calculate an average value of measured amounts, and configure the intensity of the light to be outputted through the light-emitting unit of the sensor based on the calculated average value.

In the electronic device, the processor may be further configured to periodically measure the amount of external light having a designated wavelength band through the light-receiving unit of the sensor.

In the electronic device, the processor may be further configured to compare the determined amount of external light and a preconfigured threshold value, and to set the intensity of the light to be outputted through the light-emitting unit of the sensor based on a result of the comparison.

The electronic device may further include an illuminance sensor. The processor of the electronic device may be further configured to determine the amount of external light through the light-receiving unit of the sensor and the illuminance sensor, and to configure the intensity of the light to be outputted through the light-emitting unit of the sensor based on the amount of light determined through the light-receiving unit of the sensor and the illuminance sensor.

In the electronic device, the processor may be further configured to periodically recheck the amount of external light having a designated wavelength band by using the illuminance sensor.

In the electronic device, the processor may be further configured to readjust the intensity of light to be outputted through the light-emitting unit of the sensor based on a result of the periodically rechecked amount of external light.

The electronic device may further include an RGB camera. The processor of the electronic device may be further configured to measure the amount of the external light having the designated wavelength band through an AE function of the RGB camera.

An operating method of an electronic device including a sensor is provided. An amount of external light outside the electronic device is determined through a light-receiving unit of the sensor. An intensity of light to be outputted through a light-emitting unit of the sensor is configured based on the amount of external light. The light having the configured intensity is output through the light-emitting unit of the sensor.

In the method of the electronic device, the operation of determining the amount of external light may include determining the amount of the external light having a designated wavelength band outside the electronic device through the light-receiving unit while not outputting light through the light-emitting unit of the sensor.

In the method of the electronic device, the operation of determining the amount of external light may be performed based on a generation of an event driving the sensor.

In the method of the electronic device, the operation of determining the amount of external light may include measuring the amount of external light having a designated wavelength hand a plurality of times through the light-receiving unit for a designated period of time, calculating an average value of the measured values, and setting the intensity of the light to be outputted through the light-emitting unit of the sensor based on the calculated average value.

In the method of the electronic device, the operation of determining the amount of external light may include periodically checking the amount of external light having a designated wavelength band through the light-receiving unit of the sensor.

In the method of the electronic device, the operation of configuring the intensity of the light may include comparing the determined amount of external light and a preset threshold value, and setting the intensity of the light to be outputted through the light-emitting unit of the sensor based on a result of the comparison.

In the method of the electronic device, the operation of determining the amount of external light may further include determining the amount of external light having a designated wavelength band through an illuminance sensor. The operation of configuring the intensity of the light may include configuring the intensity of the light to be outputted through the light-emitting unit of the sensor based on the amount of light determined through the light-receiving unit of the sensor and the illuminance sensor.

The method of the electronic device may further include an operation of periodically rechecking the amount of external light having a designated wavelength band by using the illuminance sensor.

The method of the electronic device may further include an operation of readjusting the intensity of light to be outputted through the light-emitting unit of the sensor based on a result of the periodically rechecked amount of external light.

An electronic device is provided that includes a sensor including a light-emitting unit capable of outputting light having a designated wavelength band and a light-receiving unit capable of obtaining external light. The electronic device also includes an illuminance sensor and a processor. The processor is configured to determine an amount of external light through the illuminance sensor, and adjust an intensity alight to be outputted through the light-emitting unit of the sensor based on the amount of external light. The processor is also configured to output the light having a designated wavelength band with the adjusted intensity through the light-emitting unit, obtain at least some of the outputted light that is reflected through the light-receiving unit, and measure a distance to an external object based on the at least some of the outputted light that is reflected.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to certain embodiments thereof, it will be understood by those skilled in the art that various changes in form and detail may be made therein without departing from the scope of the disclosure. Therefore, the scope of the disclosure should not be defined as being limited to the embodiments, but should be defined by the appended claims and equivalents thereof.

What is claimed is:

1. An electronic device comprising:
    a distance measuring sensor comprising a light-emitting unit capable of outputting light having a designated wavelength band and a light-receiving unit capable of obtaining external light; and
    a processor configured to:
        determine an amount of external light outside the electronic device through the light-receiving unit of the distance measuring sensor;
        adjust an intensity of light to be outputted through the light-emitting unit of the distance measuring sensor based on the amount of external light;
        output the light having the designated wavelength band with the adjusted intensity through the light-emitting unit of the distance measuring sensor;
        detect, through the light-receiving unit of the distance measuring sensor, reflected output light reflected by an external object; and
        calculate distance information for the external object based on the detected reflected output light,
        wherein the intensity of light to be outputted through the light-emitting unit is adjusted to a minimum value based on a determination that an amount of noise corresponding to a difference between the calculated distance information and information on an actual distance to the external object is less than a preset threshold.

2. The electronic device of claim 1, wherein the processor is further configured to control the distance measuring sensor to not output the light through the light-emitting unit while determining the amount of external light having the designated wavelength band through the light-receiving unit of the distance measuring sensor.

3. The electronic device of claim 1, wherein the processor is further configured to control the distance measuring sensor to determine the amount of external light having the designated wavelength band through the light-receiving unit based on a generation of an event driving the distance measuring sensor.

4. The electronic device of claim 3, wherein the processor is further configured to:
    measure the amount of external light having the designated wavelength band a plurality of times through the light-receiving unit for a designated period of time;
    calculate an average value of the measured amounts; and
    configure the intensity of the light to be outputted through the light-emitting unit of the distance measuring sensor based on the calculated average value.

5. The electronic device of claim 1, wherein the processor is further configured to periodically measure the amount of external light having the designated wavelength band through the light-receiving unit of the distance measuring sensor.

6. The electronic device of claim 1, wherein the processor is further configured to:
    compare the determined amount of external light and a preconfigured threshold value; and
    set the intensity of the light to be outputted through the light-emitting unit of the distance measuring sensor based on a result of the comparison.

7. The electronic device of claim 1, further comprising an illuminance sensor,
    wherein the processor is further configured to:

determine the amount of external light through the light-receiving unit of the distance measuring sensor and the illuminance sensor; and
configure the intensity of light to be outputted through the light-emitting unit of the distance measuring sensor based on the amount of light determined through the light-receiving unit of the distance measuring sensor and the illuminance sensor.

8. The electronic device of claim 7, wherein the processor is further configured to periodically recheck the amount of external light having the designated wavelength band by using the illuminance sensor.

9. The electronic device of claim 8, wherein the processor is further configured to readjust the intensity of light to be outputted through the light-emitting unit of the distance measuring sensor based on a result of the periodically rechecked amount of external light.

10. The electronic device of claim 1, further comprising a red-green-blue (RGB) camera, wherein the processor is further configured to measure the amount of the external light having the designated wavelength band through an automatic exposure function of the RGB camera.

11. An operating method of an electronic device comprising a distance measuring sensor, the method comprising:
determining an amount of external light outside the electronic device through a light-receiving unit of the distance measuring sensor;
configuring an intensity of light to be outputted through a light-emitting unit of the distance measuring sensor based on the amount of external light;
outputting the light having the configured intensity through the light-emitting unit of the distance measuring sensor;
detecting, through the light-receiving unit of the distance measuring sensor, reflected output light reflected by an external object; and
calculating distance information for the external object based on the detected reflected output light,
wherein the intensity of light to be outputted through the light-emitting unit is adjusted to a minimum value based on a determination that an amount of noise corresponding to a difference between the calculated distance information and information on an actual distance to the external object is less than a preset threshold.

12. The method of claim 11, wherein determining the amount of external light comprises determining the amount of the external light having a designated wavelength band outside the electronic device through the light-receiving unit while not outputting the light through the light-emitting unit of the distance measuring sensor.

13. The method of claim 11, wherein determining the amount of external light is based on a generation of an event driving the distance measuring sensor.

14. The method of claim 13, wherein determining the amount of external light comprises:
measuring the amount of external light having the designated wavelength band a plurality of times through the light-receiving unit for a designated period of time;
calculating an average value of the measured amounts; and
setting the intensity of the light to be outputted through the light-emitting unit of the distance measuring sensor based on the calculated average value.

15. The method of claim 11, wherein determining the amount of external light comprises periodically checking the amount of external light having the designated wavelength band through the light-receiving unit of the distance measuring sensor.

16. The method of claim 11, wherein configuring the intensity of the light comprises:
comparing the determined amount of external light and a preconfigured threshold value; and
setting the intensity of the light to be outputted through the light-emitting unit of the distance measuring sensor based on a result of the comparison.

17. The method of claim 11, wherein:
determining the amount of external light comprises determining the amount of external light through the light-receiving unit of the distance measuring sensor and an illuminance sensor of the electronic device; and
configuring the intensity of the light comprises configuring the intensity of the light to be outputted through the light-emitting unit of the distance measuring sensor based on the amount of light determined through the light-receiving unit of the distance measuring sensor and the illuminance sensor.

18. The method of claim 17, further comprising:
periodically rechecking the amount of external light having the designated wavelength band by using the illuminance sensor.

19. The method of claim 18, further comprising:
readjusting the intensity of light to be outputted through the light-emitting unit of the distance measuring sensor based on a result of the periodically rechecked amount of external light.

20. An electronic device comprising:
a distance measuring sensor comprising a light-emitting unit capable of outputting light having a designated wavelength band and a light-receiving unit capable of obtaining external light;
an illuminance sensor; and
a processor configured to:
determine an amount of external light outside the electronic device through the illuminance sensor;
adjust an intensity of light to be outputted through the light-emitting unit of the distance measuring sensor based on the amount of external light;
output the light having the designated wavelength band with the adjusted intensity through the light-emitting unit;
obtain at least some of the outputting light that is reflected through the light-receiving unit; and
measure a distance to an external object based on the at least some of the outputting light that is reflected,
wherein the intensity of light to be outputted through the light-emitting unit is adjusted to a minimum value based on a determination that an amount of noise corresponding to a difference between the calculated distance information and information on an actual distance to the external object is less than a preset threshold.

* * * * *